United States Patent [19]
Nakatani

[11] Patent Number: 6,130,619
[45] Date of Patent: Oct. 10, 2000

[54] MONITORING CIRCUIT FOR A COMMUNICATION DEVICE

[75] Inventor: Shinji Nakatani, Troy, Mich.

[73] Assignee: Nippondenso Co., Ltd., Kariya, Japan

[21] Appl. No.: 07/978,518

[22] Filed: Nov. 20, 1992

[30] Foreign Application Priority Data

Nov. 21, 1991 [JP] Japan .................................... 3-306200

[51] Int. Cl.[7] ............................................... G05B 23/02
[52] U.S. Cl. ....................................................... 340/825.16
[58] Field of Search .................. 340/825.16, 825.64, 340/825.65; 377/28, 31; 371/57.2, 62, 16.3; 328/120

[56] References Cited

U.S. PATENT DOCUMENTS

| | | | |
|---|---|---|---|
| 3,579,190 | 5/1971 | Karras | 340/825.64 |
| 3,601,706 | 8/1971 | Battle, Jr. et al. | 340/825.64 |
| 3,686,634 | 8/1972 | Malchman et al. | 340/825.64 |
| 4,177,453 | 12/1979 | Collins | 340/825.65 |
| 4,555,702 | 11/1985 | Matsuura et al. | 340/825.64 |
| 4,623,884 | 11/1986 | Ihara et al. | 371/62 |
| 4,982,404 | 1/1991 | Hartman | 371/62 |

FOREIGN PATENT DOCUMENTS 2181839 7/1990 Japan .
2184938 7/1990 Japan .

OTHER PUBLICATIONS

SAE J1850; "Class B Data Communication Network Interface"; SAE International, Aug. 1991, USA.

*Primary Examiner*—Mark H. Rinehart
*Attorney, Agent, or Firm*—Pillsbury Madison & Sutro LLP

[57] ABSTRACT

A watch-dog type monitoring circuit for a communication device has a counter and a timer. The communication device outputs a communication signal including plural groups of pulse-string signals. The maximum number of pulses in each group of pulse-string signals and the minimum idle time between successive groups of pulse-string signals are previously prescribed by a communications protocol. The counter counts pulses and outputs an abnormal condition signal when a counted number exceeds a predetermined number. The timer inputs the communication signal, measures the idle time between successive groups of pulse-string signals, and resets the counter when the measured idle time exceeds a predetermined amount of time. Since the monitoring circuit monitors whether the communication device is in an abnormal condition by judging the normality of the communication signal, it an abnormal condition of not only the communication device to which the monitoring device is connected but also an abnormal condition of earlier-stages of the communication system.

16 Claims, 5 Drawing Sheets

MONITORING CIRCUIT FOR A COMMUNICATION DEVICE

BACKGROUND OF THE INVENTION

1. Field of the Invention

The present invention relates to a monitoring circuit for a communication device which transfers a message to another device in the form of a pulse-string signal.

2. Description of Related Art

Conventional monitoring circuits are disclosed in Japanese patent application laid-open Nos. Heisei 2-181839 and Heisei 2-184938. The monitoring circuits are called "watchdog" timers. A device to be monitored outputs a pulse at predetermined time intervals, which are then input to the watch-dog timer. The monitored device is, for example, a microprocessor. The watch-dog timer then judges that an abnormal condition of the monitored device has occurred when the monitored device does not output a pulse signal to the watch-dog timer for more than a predetermined reference time from when it has output a previous pulse signal.

However, the conventional watch-dog timer requires that a pulse-string signal having a cycle time of more than the reference time be input and monitored for its presence in order to detect if an interval of the successive pulse signals is longer than the reference time. Therefore, circuits which are to be monitored must provide additional hardware in order to produce the continuous pulse-string signal. It follows that manufacturing costs are higher due to the additional hardware.

Moreover, the watch-dog timer can only monitor device which is directly connected with the watch-dog timer and which outputs the pulse signals more often than the reference time. When the device to be monitored is located in the middle-stage of a communication system, and an earlier-stage communication system is in an abnormal condition, the middle-stage device may not output an abnormal communication signal related to the earlier-stages of the communication system. Therefore, the conventional watch-dog timer cannot detect an abnormal situation of the previous stages of a communication system unless the monitored device outputs pulse signals which have an abnormal cycle.

SUMMARY OF THE INVENTION

Accordingly, it is an object of the present invention to provide a monitoring circuit which detects an abnormal condition of a communication device on the basis of a communication signal.

Another object of the present invention is to provide a monitoring circuit which detects an abnormal condition of a previous stage communication device of a communication system.

A still further object of the present invention is to reduce a manufacturing cost of such a monitoring circuit.

The present invention uses a conventional communication protocol. In a transfer of a communication signal composed of plural messages, wherein a group of pulse-string signals represent a message, the conventional communication protocol prescribes the maximum bit length in one message and a minimum idle time between successive messages.

To accomplish the foregoing and other objects, the monitoring circuit includes counting means and idle time measuring means. The counting means counts pulses and outputs an abnormal signal due to an abnormal condition of a communication device when a counted number exceeds a predetermined number. The communication device outputs a communication signal including plural groups of pulse-string signals. Each group of pulse-string signals represent a message. The idle time measuring means inputs the communication signal, measures an idle time between successive groups of the pulse-string signals, and resets the counting means when the measured idle time exceeds a predetermined reference time.

The monitoring circuit monitors whether the communication device which it is connected to is in an abnormal condition by judging the normality of the communication signal. Therefore, the monitoring circuit detects an abnormal condition of not only the communication device to which it is connected but also of a previous-stage communication device.

BRIEF DESCRIPTION OF THE DRAWINGS

The features of the present invention are set forth with particularity in the appended claims. The invention, together with the objects and advantages thereof, may best be understood by reference to the following description of the presently preferred embodiments together with the accompanying drawings in which:

DESCRIPTION OF THE PREFERRED EMBODIMENTS

The preferred embodiment of the present invention is now described with reference to the drawings.

Figure 1:
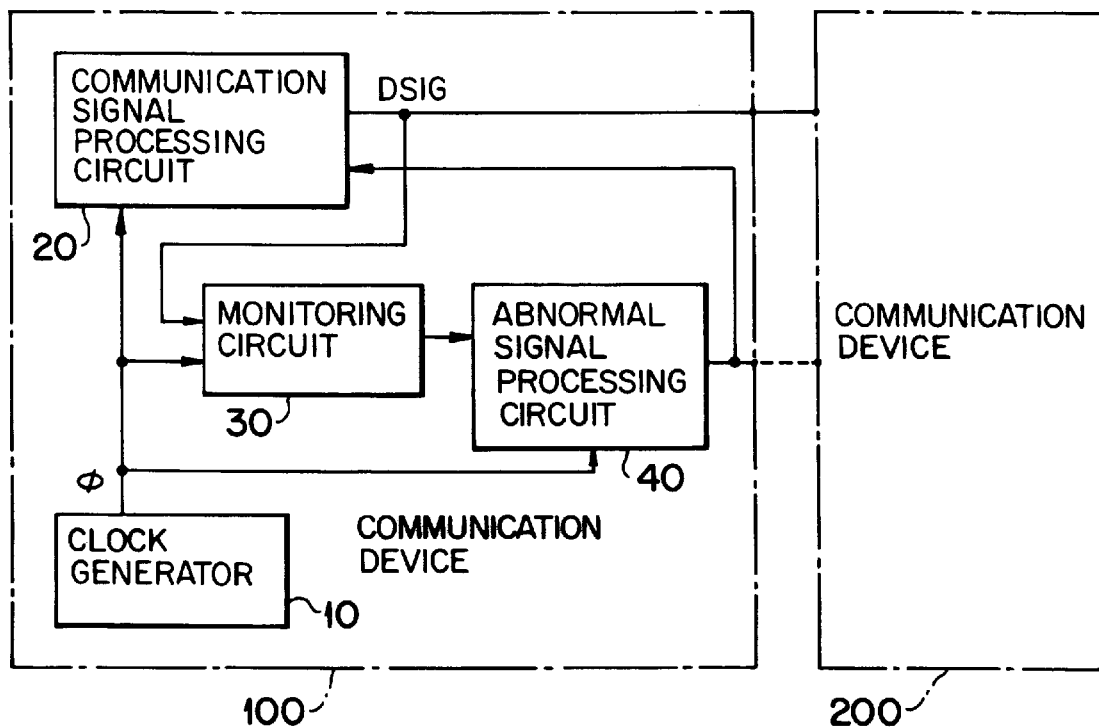
FIG. 1 is a block diagram of a communication device related to a first embodiment of the present invention.

A communication system related to a first embodiment has communication devices 100 and 200 as shown in FIG. 1. The communication device 100 serially transfers plural groups of pulse-string signals to the communication device 200. Each group of pulse-string signals represent a message. A communication signal used in the communication system obeys, for example, a communication protocol recommended in the U.S. SAE (Society of Automotive Engineers) standard J1850. The protocol prescribes that the maximum bit length (=the maximum number of pulses) in one message is normally equal to or fewer than a maximum number denoted $N_{1MAX}$ and that the idle time between successive groups of pulse-string signals is normally equal to or longer than a minimum idle time denoted by $T_{MIN}$.

The communication device 100 includes a clock generator 10, a communication signal processing circuit 20, a monitoring circuit 30 and an abnormal signal processing circuit 40.

The clock generator 10 generates reference lock signals φ which are used to determine the reference operation timing of the communication device 100. It is noted that the clock generator 10 is any of many well-known conventional clock generators, for example those generally installed in well-known digital circuit.

The communication signal processing circuit 20 is a digital circuit including a microprocessor. The communication signal processing circuit 20 newly generates a communication signal DSIG in accordance with a request input from an external device, or relays the communication signal DSIG output from an earlier-stage communication device (not shown). The communication signal DSIG is composed of plural groups of pulse-string signals and the idle time T between successive groups of the pulse-string signals Ts shown in signal (A) of FIG. 3.

Figure 2:
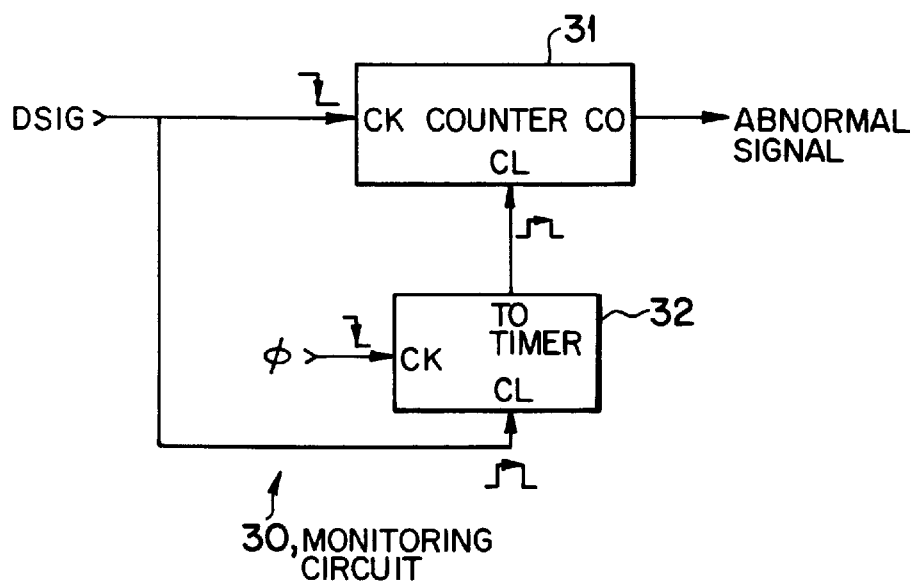
FIG. 2 is a block diagram of a monitoring circuit according to the first embodiment.

The reference clock signals φ and the communication signal DSIG are input to the monitoring circuit 30. The monitoring circuit 30 includes a counter 31 and a timer 32 as shown in FIG. 2.

The communication signal DSIG is input to the clock input terminal CK of the counter 31, and the counter 31 counts pulses of each group of the pulse-string signals of the signal DSIG in response to falling edges of the pulses. When the counted number of pulses in the message exceeds the expected maximum number $N_{1MAX}$, the counter 31 overflows and outputs an abnormal signal at a high level from the carry-out terminal CO. A clear terminal CL of the counter 31 is connected to an output terminal TO of the timer 32. When a high-level signal is input to the clear terminal CL, the counter 31 clears or resets the counted value.

The timer 32 measures the idle time of the communication signal DSIG between successive groups of pulse-string signals of the communication signal DSIG. The referenced clock signal φ is input to the timer 32 clock at input terminal ck, and pulses of the reference clock signal φ are counted in response to falling edges of the pulses of the clock signal φ.

When the number of idle time pulses of the clock generator 10 counted by the timer 32 exceeds the number corresponding to the minimum idle time $T_{MIN}$, the timer 32 outputs a high-level signal at its output terminal TO to clear the counter 31. The communication signal DSIG is input to the clear terminal of the timer 32 so that when the pulses of the signal DSIG are at a high level, the timer 32 is cleared and allows the counter 31 to count.

The carry-out terminal Co of the counter 31 is connected to the abnormal signal processing circuit 40. The abnormal signal processing circuit 40 inputs the abnormal signal output from the counter 31, and stores the abnormal signal in memory therein, and also outputs a command which forbids the communication signal processing circuit 20 from outputting the communication signal DSIG. The command may be applied to the communication device 200 and other communication devices in order to stop their operation due to the abnormal condition. The reference clock signal φ is also input to the abnormal signal processing circuit 40. It is noted that the communication device 200 from which the communication device 100 receives messages may be any suitable well-known circuit using the expected protocol; therefore, a detailed explanation of the communication device 200 is omitted.

Operation of the above-mentioned communication system will be described hereinafter with reference to FIGS. 3–5.

A first case wherein the communication signal processing circuit 20 outputs the normal communication signal DSIG obeying the above-mentioned communication protocol is first explained with reference to FIG. 3. In this case, the number of pulses in the pulse-string signals of the signal DSIG are fewer than the expected maximum number $N_{1MAX}$, and the idle time T is longer than the minimum idle time $T_{MIN}$. Therefore, the idle time is sufficient but the length of the message of signal DSIG is abnormal.

Figure 3:
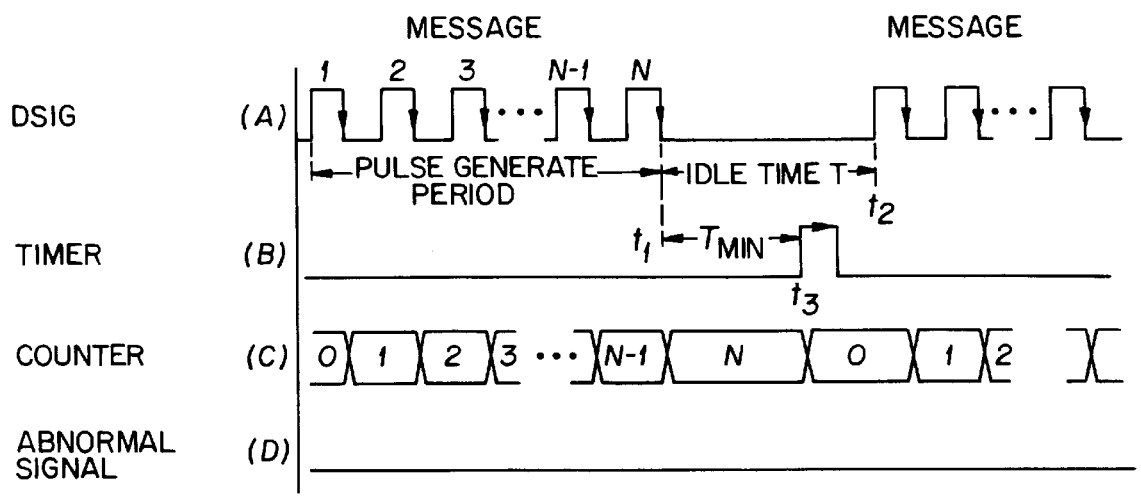
FIGS. 3–5 are timing charts showing a timing of each signal in the monitoring-circuit shown in FIG. 2.

As mentioned above, since the timer 32 is cleared when the pulse of the signal DSIG is at a high level and measures the idle time between messages of the signal DSIG by counting the pulses of the reference clock signal φ when the signal DSIG is at a low level, the timer 32 will measure the idle time during the period between an end time $t_1$ of the pulses in a message (pulse generating period) and an end time $t_2$ of the idle time T as shown by signal (A) in FIG. 3. Since the idle time T is longer than the minimum idle time $T_{MIN}$ as shown by signal (A) and (B) of FIG. 3, the timer 32 outputs the high-level signal to clear the counter 31 at time $t_3$ when the idle time T exceeds the minimum idle time $T_{MIN}$.

As shown by signal (C) of FIG. 3, the counter 31 first counts up from "0" to "1" in response to the falling edge of the first pulse of the pulse-string signal of the signal DSIG, and counts up the number of following pulses in the pulse-string signal one after another. Then, counter 31 temporarily stops its count operation after the counted number becomes "N" in response to the falling edge of the last (=Nth) pulse of the pulse-string signal. Thereafter, the timer 32 outputs a high-level signal to the clear terminal CL of the counter 31, and the counter 31 is reset and returns the counter value to "0".

Here, in FIG. 3, the counted value N is fewer than the maximum value Nose; therefore, the counter 31 does not overflow and does not output the abnormal condition signal as shown by signal (D) of FIG. 3. Consequently, the abnormal signal processing circuit 40 allows the communication signal processing circuit 20 to output the signal DSIG, and the communication signal processing circuit 20 continually outputs signal DSIG.

Next, a second case wherein the number of pulses of the pulse-string signals in the pulse generating period is more than the maximum number $N_{1MAX}$, and that the idle time T is longer than the minimum idle time $T_{MIN}$, is now explained with reference to FIG. 4.

Figure 4:
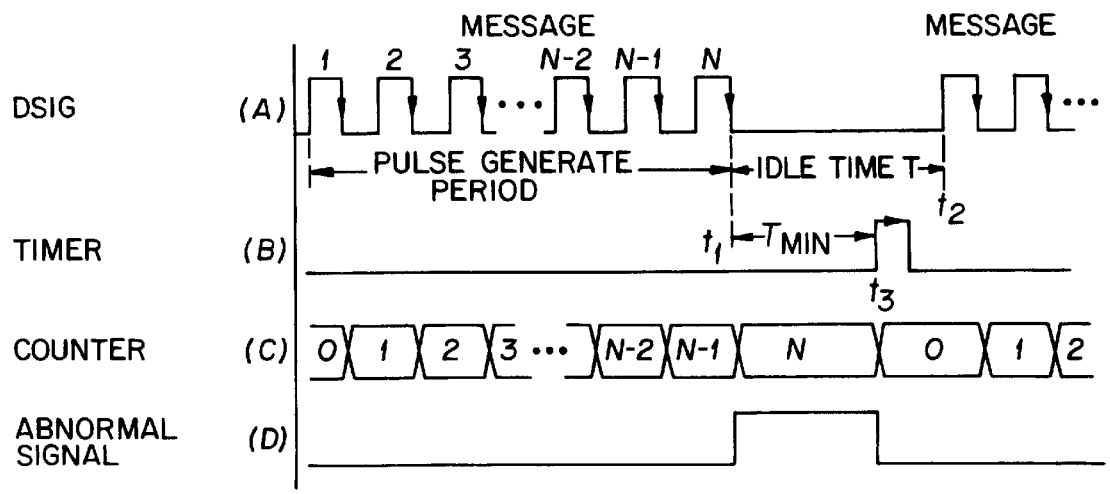

Since the idle time T between time $t_1$ and time $t_2$ is longer than the minimum idle time $T_{MIN}$, the timer 32 outputs a high-level signal to clear the counter 31 at time $t_3$ before time $t_2$ as shown in signals (A) and (B) of FIG. 4. The counter 31 counts up to "N" by a counting operation as in the above-mentioned first case with reference to FIG. 3. However, in the second case, since the counted number N is larger than the maximum number $N_{1MAX}$, as shown by signal (D) of FIG. 4, the counter 31 overflows and outputs the abnormal condition signal. Consequently, the abnormal signal processing circuit 40 outputs the command to forbid the communication signal processing circuit 20 from outputting the signal DSIG. It is noted that FIG. 4 shows the case wherein the counted number N is larger than the maximum number $N_{1MAX}$ by one, but the number N may be larger than the maximum number $N_{1MAX}$ by more than one.

Next, a third case wherein the number of pulses of the pulse-string signals in the pulse generating period is fewer than the maximum number $N_{1MAX}$, and the idle time T is shorter than the minimum idle time $T_{MIN}$, is now explained with reference to FIG. 5.

Figure 5:
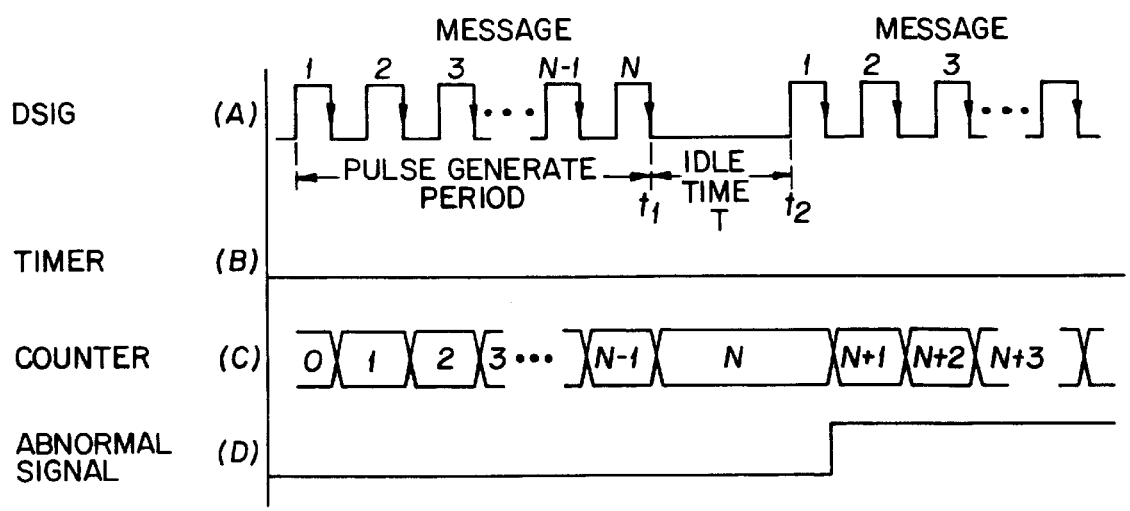

As shown in signals (A) and (B) of FIG. 5, since the idle time T between the time $t_1$ to the time $t_2$ is shorter than the minimum idle time $T_{MIN}$, the timer 32 does not internally count the clock pulses φ up to the number corresponding to the minimum idle time $T_{MIN}$ and therefore does not output a high-level signal. Therefore, the counter 31 is not cleared during the idle time T, and it continues to count successive numbers even in the next pulse generating period. The counted number exceeds N, and the counter 31 overflows and finally outputs the abnormal condition signal when the counted number becomes larger than the maximum number $N_{1MAX}$. Consequently, the abnormal signal processing circuit 40 outputs the command to forbid the communication signal processing circuit 20 from outputting the signal DSIG. It is noted that FIG. 5 shows an example that the number N is equal to the maximum number $N_{1MAX}$, but the number N may be fewer or larger than the maximum number $N_{1MAX}$.

As described above, according to the first embodiment, the monitoring circuit 30 of the present invention monitors whether or not the communication signal processing circuit 20 is in an abnormal condition by judging the abnormal condition of the signal DSIG output from the communication signal processing circuit 20. The monitoring circuit 30 utilizes only the communication signal DSIG and the reference clock signal φ to monitor for an abnormal condition without the need for a special pulse-string signal that the above-mentioned watch-dog timer needs. Therefore, it is possible to reduce the manufacturing costs of the monitoring circuit 30.

In the case where the communication device 100 relays the communication signal DSIG output from an earlier-stage communication device, when an abnormal communication signal DSIG which was output from the earlier-stage communication device is output through the relaying middle-stage communication device 100, the monitoring circuit 30 can detect the abnormal situation of the earlier-stage communication device on the basis of the abnormal communication signal DSIG relayed by the middle-stage communication device 100. Therefore, when the first embodiment is applied in a communication system in which many communication devices are serially connected with each other, it is possible to reduce the number of monitoring circuits required to as few as one.

In the first embodiment, the counted number at which the counter 31 overflows corresponds with the maximum $N_{1MAX}$, which is prescribed by the communication protocol, but the number may be larger than the maximum number $N_{1MAX}$. The period during which the timer 32 counts the clock pulses φ as the idle time may be shorter than the prescribed minimum idle time $T_{MIN}$.

Figure 6:
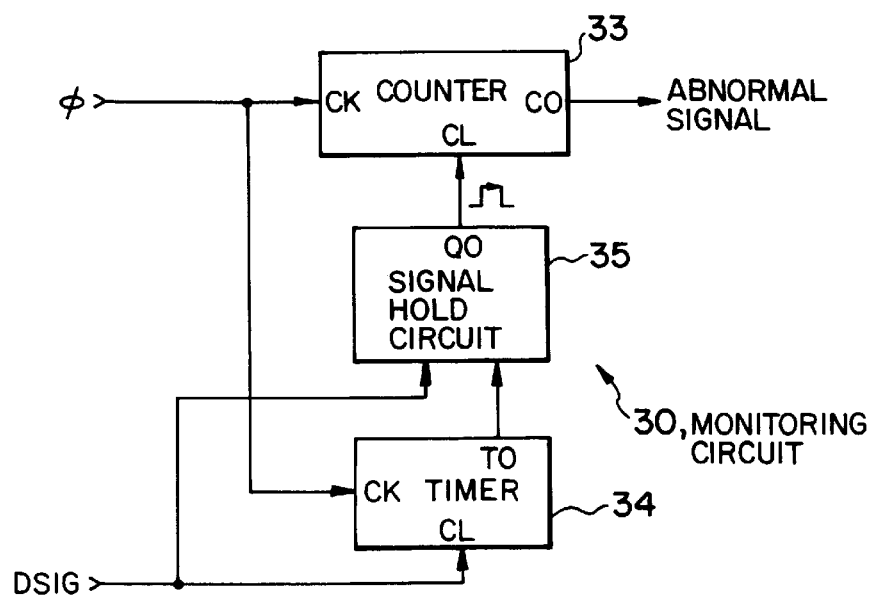
FIG. 6 is a block diagram of a monitoring circuit according to a second embodiment of the present invention.

A second embodiment of the present invention is now explained with reference to FIGS. 6–10. In a communication device according to the second embodiment, only the monitoring circuit 30 of the first embodiment is modified. The modified monitoring circuit is shown in FIG. 6 as number 30'.

The modified monitoring circuit 30' includes a counter 33, a timer 34 and a signal hold circuit 35.

The reference clock signal φ to input to the clock input terminal CK of the counter 33, and counts the pulses of the clock signal φ in response to falling edges of the pulses. When the counted number of clock pulses φ exceeds a predetermined maximum number $N_{2MAX}$, the counter 33 overflows and outputs an abnormal condition signal at a high level from its carry-out terminal CO. A clear terminal CL of the counter 33 is connected with an output terminal Q0 of the signal hold circuit 35. When a high-level signal is input to the clear terminal CL of the counter from the signal hold circuit 35, the counter 33 is cleared and resets the counted number.

The maximum number $N_{2MAX}$ is represented by the following equation (1):

$$N_{2MAX}=(T_{MAX}+T_{MIN})/ts \tag{1}$$

wherein $T_{MAX}$ denotes a maximum pulse generating period to be required for communicating pulses corresponding to the above-mentioned maximum number $N_{1MAX}$; $T_{MIN}$ denotes the above-mentioned minimum idle time $T_{MIN}$; and ts denotes a cycle of the reference clock signal φ.

The timer 34 measures the idle time between successive groups of the pulse-string signals of the communication signals DSIG. The reference clock signal φ is input to the clock input terminal CK of the timer 34, and counts pulses of the reference clock signal φ in response to the falling edge of the pulses. When the counted number exceeds the number corresponding to the minimum idle time $T_{MIN}$, the timer 34 outputs a high-level signal at its output terminal TO. A clear terminal CL of the timer 34 receives the communication signal DSIG. When the pulses of the signal DSIG are at high level, the timer 34 is cleared.

The signal hold circuit 35 is composed of, for example, a flip-flop circuit. The signal hold circuit 35 receives the high-level signal from the timer 34 and the communication signal DSIG. The high-level signal from the timer 34 sets the signal hold circuit 35, and the signal DSIG resets the signal hold circuit 35. Therefore, the signal hold circuit 35 continually outputs a high-level signal from its output terminal Q0 after the timer 34 outputs a high-level signal and until the signal hold circuit 35 receives the next group of pulse-string signals of the communication signal DSIG.

Operation of the communication device related to the second embodiment is now described with reference to FIGS. 7–9.

A first case wherein the communication signal processing circuit 20 outputs the normal communication signal DSIG is first explained with reference to FIG. 7. In this case, the number N of pulses of the pulse-string signals in the pulse generating period $T_{PT}$ shown in signal (A) of FIG. 7 is fewer than the maximum number $N_{1MAX}$, and accordingly the pulse generating period $T_{PT}$ required for communicating the pulses is shorter than the maximum pulse generating period $T_{MAX}$, and the idle time T is longer than the minimum idle time $T_{MIN}$.

Figure 7:
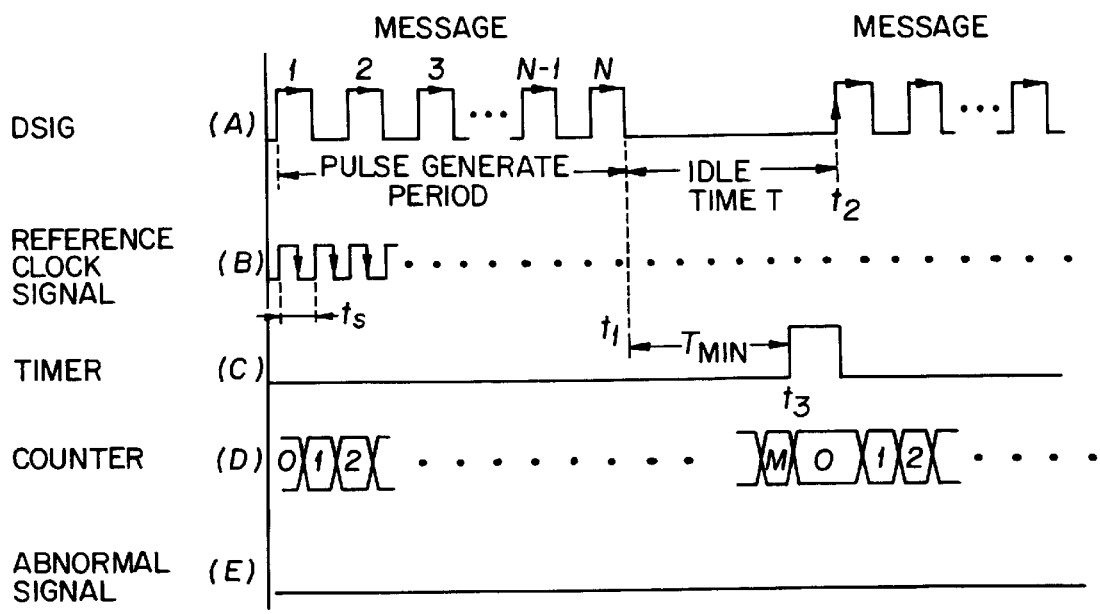
FIGS. 7–10 are timing charts showing a timing of each signal in the monitoring circuit shown in FIG. 6.
Figure 8:
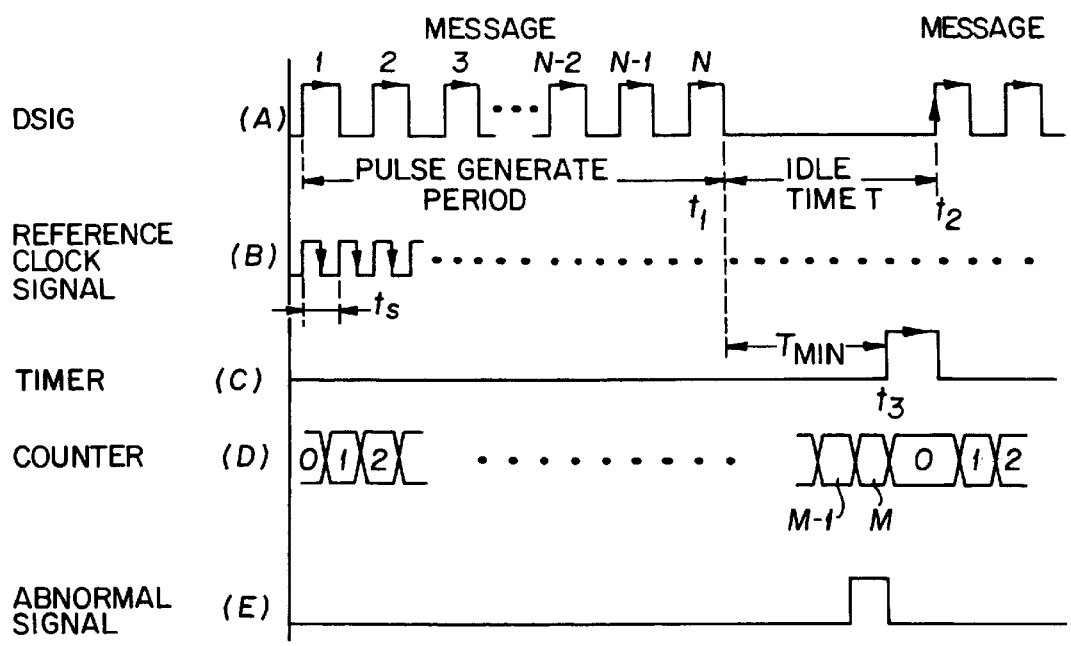

As mentioned above, since the timer 34 is cleared when the pulse of the signal DSIG is at a high level and measures the idle time by counting the pulses of the reference clock signal φ when the signal DSIG is at a low level as shown in signal (B) of FIG. 7, the timer 34 measures the idle time during the period between an end time $t_1$ of the pulse generating period $T_{PT}$ and an end time $t_2$ of the idle time T. Since the idle time T is longer than the minimum idle time $T_{MIN}$ shown in signal (C) of FIG. 7, the timer 34 outputs a high-level signal to the signal hold circuit 35 at time $t_3$ when the idle time T exceeds the minimum idle time $T_{MIN}$. The signal hold circuit 35 outputs a high-level signal to the counter 33 in response to the high-level signal transferred from the timer 34, and keeps outputting the high-level signal to clear the counter 33 until the signal hold circuit 35 inputs the next group of pulse-string signals of the communication signal DSIG.

The counter 33 counts the pulses of the reference clock signal φ during the pulse generating period $T_{PT}$ and the successive minimum idle time $T_{MIN}$ as shown in signal (D) of FIG. 7. The finally counted number M is represented by the following equation (2):

$$M=(T_{PT}+T_{MIN})/ts \tag{2}$$

Since the pulse generating period $T_{PT}$ is shorter than the maximum pulse generating time $T_{MAX}$, the counted number M is smaller than the maximum number $N_{2MAX}$. Therefore, the counter 33 does not overflow, and does not output the abnormal condition signal as shown in signal (E) of FIG. 7.

Next, a second case wherein the number N of pulses of the pulse-string signals in the pulse generating period is larger than the maximum number $N_{1MAX}$, in other words, the pulse generate period $T_{PT}$ is longer than the maximum pulse generate time $T_{MAX}$, and the idle time T is longer than the minimum idle time $T_{MIN}$, is explained with reference to FIG. 8.

Since the idle time T between time $t_1$ and time $t_2$ is longer than the minimum idle time $T_{MIN}$, the timer 34 outputs a high-level signal to set the signal hold circuit 35. The set signal hold circuit 35 also outputs a high-level signal to clear the counter 33 at time $t_3$ as shown in signals (A), (B) and (C) of FIG. 8. The counter 33 counts up to "M" by a counting operation similar to the above-mentioned first case as shown in signal (D) of FIG. 8. However, in the second case, since the counted number M is larger than the maximum number $N_{1MAX}$ because the pulse generating period $T_{PT}$ is longer than the maximum pulse generating period $T_{MAX}$, the counter 33 overflows and outputs the abnormal condition signal as shown in signal (E) of FIG. 8.

Next, a third case wherein the idle time T is shorter than the minimum idle time $T_{MIN}$, and the number of pulses of a pulse-string signal in the pulse generating period is fewer than the maximum number $N_{1MAX}$, is now explained with reference to FIG. 9.

Figure 9:
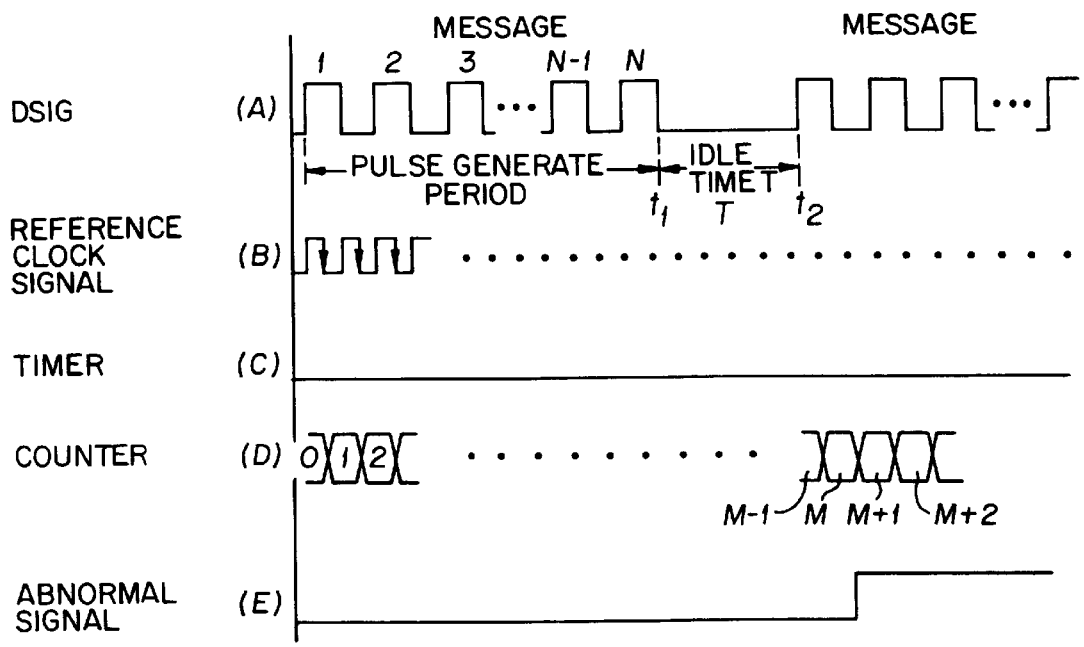

Since the idle time T between the time $t_1$ to the time $t_2$ is, as shown in signal (A) of FIG. 9, shorter than the minimum idle time $T_{MIN}$, the timer 34 does not count up to the number corresponding to the minimum idle time $T_{MIN}$, and therefore does not output a high-level signal. Therefore, the signal hold circuit 35 does not output a high-level signal to the counter 33 as shown in signal (C) of FIG. 9. It follows that the counter 33 keeps counting the successive pulses of the reference clock signal φ without being rest as shown in signal (D) of FIG. 9. When the counted number becomes larger than the maximum number $N_{2MAX}$, the counter 33 overflows and outputs the abnormal condition signal as shown in signal (E) line E of FIG. 9. Although FIG. 9 shows an example that the counted number M is equal to the maximum number $N_{2MAX}$, the number M may be fewer or larger than the number $N_{2MAX}$.

It is noted that the operation after outputting the abnormal condition signal is the same as the above-mentioned first embodiment.

As described above, according to the second embodiment, the monitoring circuit 30' utilizes only the communication signal DSIG and the reference clock signal φ in order to monitor the abnormal condition of the communication system without the special pulse-string signal that the conventional watch-dog timer requires. Therefore, this second embodiment has the same merits as the first embodiment.

Figure 10:
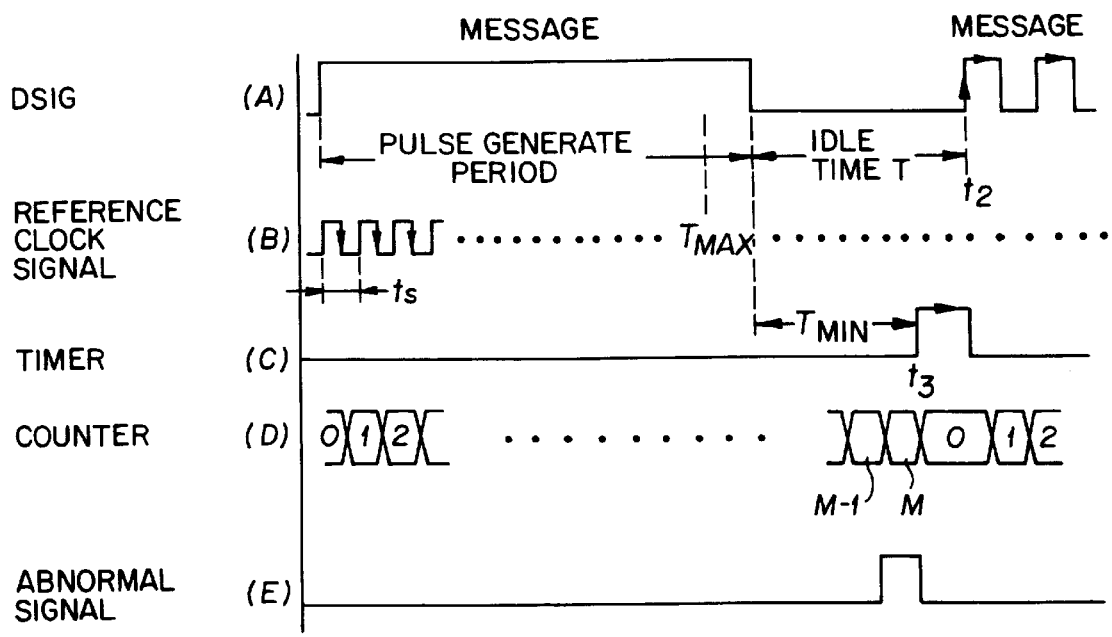

Moreover, the monitoring circuit 30' according to the second embodiment detects an abnormal condition during the pulse generating period $T_{PT}$ when the period $T_{PT}$ is longer than the maximum pulse generating period $T_{MAX}$, wherein the number N of pulses of a pulse-string signal in the pulse generating period is smaller than the maximum number $N_{1MAX}$. More particularly, since the counter 33 counts the pulses of the reference clock signal φ instead of the pulses of the pulse-string signals, the counter 33 overflows and outputs the abnormal condition signal independently of the pulses of the pulse-string signal, as shown in FIG. 10.

In the second embodiment, the counter 33 overflows when the counted number exceeds the maximum number $N_{2MAX}$, but it also overflows when the counted number exceeds the maximum number $N_{2MAX}$. The period during which the timer 34 measures the idle time before it outputs a high-level signal may be shorter.

The monitoring circuits 30 and 30' of the first and second embodiments do not output the abnormal condition signal when a width of each pulse of the communication signal DSIG is too wide or too narrow. However, as the communication device should also limit the pulse width, it is desirable to add another monitoring circuit to the device of the first and second embodiments, wherein the monitoring circuit detects the pulse width and outputs an abnormal condition signal when the pulse width is not in a predetermined range.

The counters 31 and 33 and/or the timers 32 and 34 may be composed of serially connected inverse flip-flop circuits, or may be an accumulator which is composed of an adder and a register, or may be replaced by a programmed computer.

What is claimed is:

1. A monitoring circuit for a communication device which outputs a communication signal including plural groups of pulse-string signals, wherein each one of said plural groups of said pulse-string signals represents a message, and wherein there is a predetermined normal maximum number $N_{1MAX}$ of pulses in each said group of said pulse-string signals and a predetermined normal minimum idle time $T_{MIN}$ between successive ones of said groups of said pulse-string signals, said monitoring circuit comprising:

counting means receiving said communication signal, for counting a number of pulses in each said group of said pulse-string signals of said communication signal, and when said counted number of pulses exceeds a predetermined maximum number of pulses which is equal to at least said maximum number $N_{1MAX}$, for outputting an abnormal condition signal which represents an abnormal condition of said communication device; and idle time measuring means, receiving a reference clock signal and being responsive to said communication signal, for measuring an amount of idle time between successive ones of said groups of said pulse-string signals of said communication signal by counting a number of pulses of said reference clock signal, and for resetting said counting means when said measured idle time exceeds a predetermined minimum amount of idle time which is at most said minimum idle time $T_{MIN}$.

2. A communication device comprising:

communication signal processing means for outputting a communication signal including plural groups of pulse-string signals, each one of said plural groups of said pulse-string signals representing a message, there being a predetermined normal maximum number $N_{1MAX}$ of pulses in each of said plural groups of said pulse-string signals and a normal minimum idle time $T_{MIN}$ between successive ones of said plural groups of said pulse-string signals;

a clock generator outputting a reference clock signal in accordance with said communication signal, to said communication signal processing means; and a monitoring circuit including, (a) counting means receiving said communication signal, for counting a number of pulses in each group of said pulse-string signals of said communication signal, and when said counted number of pulses exceeds a predetermined maximum number of pulses, for outputting an abnormal condition signal which represents an abnormal condition of said communication device, and (b) idle time measuring means, receiving said reference clock signal and being responsive to said communication signals for measuring an amount of idle time between successive ones of said groups of said pulse-string signals of said communication signal by counting a number of pulses of said reference clock signal, and for resetting said counting means when said measured idle time exceeds a predetermined minimum amount of time corresponding to said minimum idle time $T_{MIN}$.

3. A communication device according to claim 2, further comprising an abnormal condition signal processing circuit for receiving said abnormal condition signal and for outputting a command to said communication device which forbids said communication signal processing means from outputting said communication signal from said communication device.

4. A monitoring circuit according to claim 2, wherein said predetermined maximum number of pulses is equal to at least said maximum number $N_{1MAX}$.

5. A monitoring circuit according to claim 4, wherein said predetermined maximum number of pulses is at least a maximum number $N_{2MAX}$ which is represented by the following equation:

$$N_{2MAX}=(T_{MAX}+T_{MIN})/ts$$

wherein $T_{MAX}$ denotes a maximum pulse generating time period required for communicating said message, and ts denotes a time period for a cycle of said reference clock signal.

6. A monitoring circuit according to claim 5, wherein said counting means receives said reference clock signal, counts pulses of said reference clock signal, and outputs said abnormal condition signal when a number of said counted pulses of said reference clock signal exceeds said maximum number $N_{2MAX}$.

7. A monitoring circuit according to claim 6, wherein said idle time measuring means repeatedly resets said counting means after said measured idle time exceeds said predetermined minimum amount of idle time which is at most said minimum idle time $T_{MIN}$ until an end of said idle time.

8. A monitoring circuit according to claim 7, wherein said idle time measuring means comprises:

a signal hold circuit receiving said communication signal and being reset in accordance with said communication signal; and a timer receiving said reference clock signal, said timer measuring said amount of time that said communication signal is idle as said idle time, and said timer setting said signal hold circuit when said measured idle time exceeds said predetermined minimum amount of idle time.

9. A monitoring circuit according to claim 4, wherein said counting means includes:

means for receiving said communication signals;

means for counting said pulses in each said group of said pulse-string signals; and means for outputting said abnormal condition signal when said counted number of pulses exceeds said maximum number $N_{1MAX}$ of pulses.

10. A monitoring circuit according to claim 9, wherein said predetermined minimum amount of time is equal to at most said minimum idle time $T_{MIN}$.

11. A monitoring circuit according to claim 10, wherein said idle time measuring means includes:

means for receiving said reference clock signal and for measuring said idle time of said communication signal in accordance with said reference clock signal.

12. A monitoring circuit according to claim 1, wherein said reference clock signal corresponds to a timing of pulses of said pulse-string signals of said communication device.

13. A monitoring circuit for a communication device which outputs a communication signal including plural groups of pulse-string signals, wherein each one of said plural groups of said pulse-string signals represents a message, and wherein there is a predetermined normal maximum number $N_{1MAX}$ of pulses in each said group of said pulse-string signals and a predetermined normal minimum idle time $T_{MIN}$ between successive ones of said groups of said pulse-string signals, said monitoring circuit comprising:

counting means, receiving a reference clock signal, for counting a number of pulses of said reference clock signal, and for outputting an abnormal condition signal representing an abnormal condition of said communication device when said counted number of pulses of said reference clock signal exceeds a predetermined maximum number of pulses which is at least a maximum number $N_{2MAX}$ which is represented by the following equation:

$$N_{2MAX}=(T_{MAX}+T_{MIN})/ts$$

wherein $T_{MAX}$ denotes a maximum pulse generating time period required for communicating said message, and ts denotes a time period for a cycle of said reference clock signal; and idle time measuring means, receiving said reference clock signal and being responsive to said communication signal, for measuring an amount of idle time between successive ones of said groups of said pulse-string signals of said communication signal by counting a number of pulses of said reference clock signal during said idle time, and for resetting said counting means when said measured idle time exceeds a predetermined minimum amount of idle time which is at most said minimum idle time $T_{MIN}$.

14. A monitoring circuit according to claim 13, wherein said reference clock signal corresponds to a timing of pulses of said pulse-string signals of said communication device.

15. A monitoring circuit according to claim 14, wherein said idle time measuring means resets said counting means after said measured idle time exceeds said predetermined minimum amount of idle time, said idle time measuring means continuing to reset said counting means until said idle time ends.

16. A monitoring circuit according to claim 15, wherein said idle time measuring means comprises:

a signal hold circuit receiving said communication signal and being reset in accordance with said communication signal; and a timer receiving said reference clock signal, said timer measuring said amount of time that said communication signal is idle as said idle time, and said timer setting said signal hold circuit when said measured idle time exceeds said predetermined minimum amount of idle time.

* * * * *